Feb. 3. 1925.

J. A. SINGER

SPEED TIME RECORDER

Filed Nov. 16, 1923

Witnesses:

Inventor:
Joseph A. Singer
By Joshua R. H. Potts
His Attorney

Feb. 3, 1925.
J. A. SINGER
SPEED TIME RECORDER
Filed Nov. 16, 1923
1,525,329
2 Sheets-Sheet 2
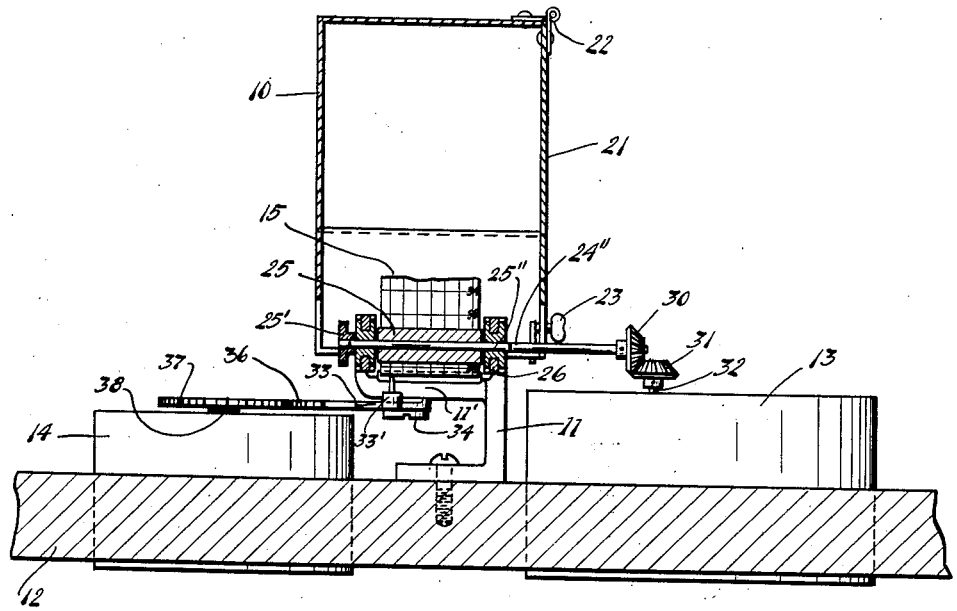
Fig. 3
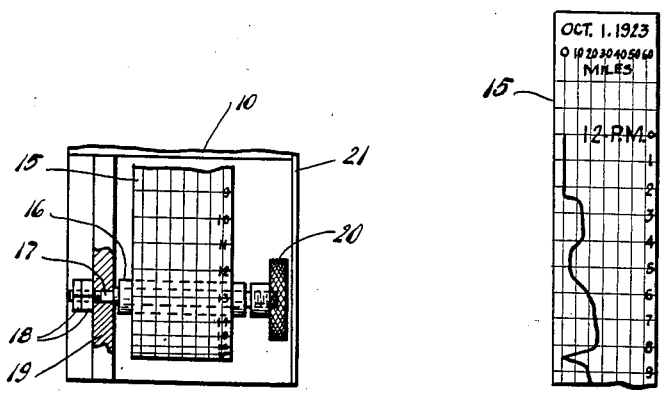
Fig. 4
Fig. 5
Witnesses:
Inventor:
Joseph A. Singer
By Joshua R. H. Potts
His Attorney.

Patented Feb. 3, 1925.

1,525,329

UNITED STATES PATENT OFFICE.

JOSEPH A. SINGER, OF CHICAGO, ILLINOIS.

SPEED-TIME RECORDER.

Application filed November 16, 1923. Serial No. 675,102.

*To all whom it may concern:*

Be it known that I, JOSEPH A. SINGER, a citizen of the United States, and a resident of the city of Chicago, county of Cook, and State of Illinois, have invented certain new and useful Improvements in Speed-Time Recorders, of which the following is a specification.

My invention relates to speed time recorders, such as are adapted for use on automobiles and also on other vehicles or moving bodies, such as carriages, motorcycles, railway cars, boats, aeroplanes, etc.

The invention has for its object the provision of means for producing a complete record of the speed of travel of the automobile or moving body, together with the time and date, during the entire time of use.

Another object is to provide such a recording device with means for connecting the device with a movable or rotatable part of an automobile or movable body and also with means for connecting it with a rotatable part of a timepiece mounted on said automobile or movable body, in order to actuate the recording means of said device.

Other objects will appear hereinafter.

The invention consists in the combinations and arrangements of parts hereinafter described and claimed.

The invention will be best understood by reference to the accompanying drawings forming a part of this specification, and in which—

Fig. 3 is a horizontal section taken on line 3—3 of Fig. 1;

Fig. 4 is a vertical section taken on line 4—4 of Fig. 2, and

Fig. 5 shows a portion of the record sheet, with the various speeds at certain times recorded thereon by a continuous curved line.

Figure 1:
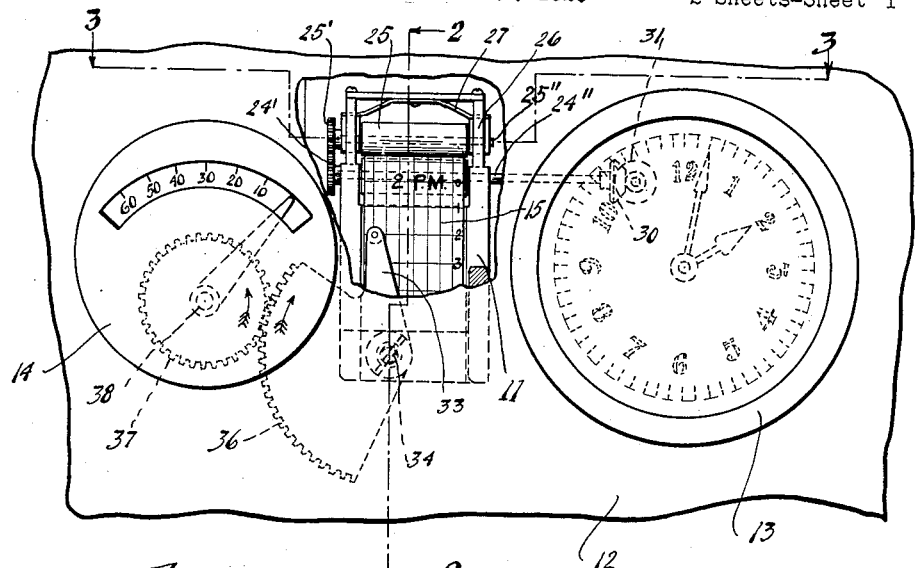
Fig. 1 is an elevational view showing my invention applied to an automobile, and connected with and actuated by rotatable parts of the speedometer and the time piece of said automobile.

For the purpose of illustration the preferred form of my invention only has been illustrated in the drawings, and this comprises a supporting member including a casing 10 and a bracket 11 thereon which is fastened to the front of an instrument board 12 of an automobile with screws or in any suitable manner; and is preferably mounted between the timepiece 13 and the speedometer 14, both being of known construction and positioned on the instrument board of said automobile, substantially in the manner shown.

The particular form of recording device illustrated is provided with a sheet or means 15 for receiving the record, and preferably in the form of a strip rolled on a roller 16 which is rotatable on a shaft 17 fastened with lock nuts 18 in a side portion 19 of said casing 10, said rolled strip being replaceable by removing a knurled nut 20 threaded on shaft 17. Said sheet or strip is preferably sectioned and marked longitudinally for time, and laterally for speed of travel, the initial date being entered on the top of the strip when said strip is put into use in the recording device, as best shown at the top of Fig. 5. Access is provided to said nut 20 for renewing the roll, and to the interior of the casing for removing the marked strip with the completed record thereon, by means of a swingable side 21 mounted on hinges 22 and which is fastened in position with a wing bolt or means 23, or in a similar suitable manner.

Figure 2:
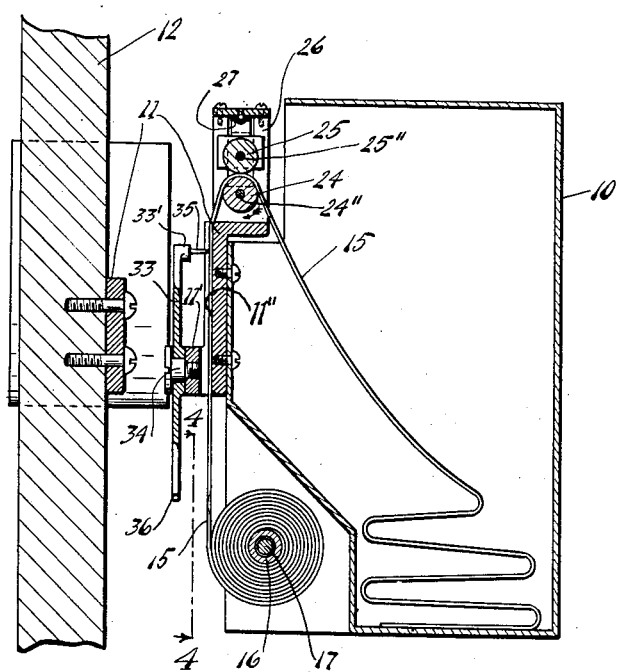
Fig. 2 is a vertical cross section taken on line 2—2 of Fig. 1.

The means for actuating or advancing the sheet or strip 15 in accord with the time comprises a pair of rollers 24 and 25, preferably having rubber or similar friction surfaces, mounted in upstanding arms 26 of bracket 11, and operated in unison by intermeshing gears 24' and 25' fastened on shafts 24'' and 25'' of said rollers 24 and 25 respectively, said rollers 25 being preferably held yieldably against rollers 24 by the use of a bent spring 27 or the like, thereby firmly and positively grasping and advancing said record sheet over a face portion at the front of said bracket 11, and which is then forwarded and deposited into the casing 10 as best shown in Fig. 2. The shaft 24'' extends back of the timepiece 13 and has a gear 30 fastened at its outer end to mesh with a gear 31 mounted on a shaft 32 which is extended through the rear wall of the timepiece and is secured to a rotatable part or member of the gear mechanism of said timepiece, or is substituted for a rotatable shaft of the timepiece, or may be secured to a suitable rotary member of said gear mechanism.

The means for making the record on the record sheet comprises a member or arm 33 swingably mounted with a pivot pin 34 on an extension 11' on said bracket 11, said arm carrying a suitable pencil or marking member 35 in its outer cuff 33', and said arm being made slightly resilient to retain said pencil in proper engagement with the sheet, or other suitable means is provided on the cuff 33' to hold the pencil in proper contact with sheet 15. A segmental gear 36 is formed on said arm and is engaged and actuated by a gear 37 mounted on a shaft 38 extending through the rear wall of the speedometer 14 and being secured to a suitable oscillating member in said speedometer, or it may take the place of a suitable rotary shaft of said speedometer, said gear 37 and segment 36 being made of suitable size to move the pencil 35 the proper distances laterally across the record sheet with the movement of the speedometer to properly record the speed of travel of the automobile upon said sheet, as it passes over the face portion 11" of bracket 11.

I have illustrated the recording device in conjunction with an automobile and connected with a movable part or shaft of the timepiece of said automobile, and have shown the gear 37 fastened and actuated by a movable part of the speedometer; but said gear 37 may also be arranged to be actuated by any other suitable movable part of the automobile such as the drive shaft or the like, and may furthermore be adapted to be secured to and actuated by a rotary shaft or wheel of an automobile, motorcycle, boat, aeroplane, vehicle, etc., and where the vehicle or movable body does not possess a timepiece, a suitable timepiece will be installed in proper position to actuate the shaft 24" and advance the strip 15 at the proper rate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination in an automobile having a speedometer and a timepiece, of a speed recorder comprising a casing mountable forwardly on the instrument board of said automobile and having a vertical face portion, a record strip movable over said face portion, means for advancing said strip, means forwardly of said board and driven by a rotatable member of a timepiece for actuating said advancing means, movable means with a marker thereon for marking on said sheet while passing over the face portion, gear means for driving said movable means, and gear means securable on a movable part of the speedometer to actuate said marking means.

2. A speed recorder for a vehicle having an instrument board with a speedometer and time piece mounted therein and facing rearwardly of said vehicle, said speed recorder comprising a casing with supporting means for mounting it on the front of said instrument board and with a face plate positioned forwardly of said speedometer and time piece, a record sheet marked for distance and for time, means for moving said sheet over said face plate, means connected to a rotary member of said time piece for driving said moving means, marking means mounted on said casing, and gear means connected to a movable member of said speedometer extending forwardly of said instrument board to move said marking means to record the speed of said vehicle on said sheet.

3. The combination in an automobile having a speedometer and a time piece, of a recording device comprising supporting means including a casing and a bracket thereon for mounting the device on said automobile, a record strip marked for distance and for time and movable on said casing, arms extending from said bracket and having roller means mounted thereon for grasping and advancing said record strip longitudinally, a spring between said arms to press said roller means together, a shaft on said roller means, mounted on a rotatable member of said time piece for actuating said shaft, an arm with marking means thereon movable laterally over said sheet, a gear on said arm, and a gear meshing therewith and arranged for mounting it on a movable part of said speedometer.

4. The combination, in an automobile having a speedometer and a timepiece, of a speed recording device comprising a casing with a bracket for mounting it on said automobile, a rolled record strip replaceably mounted on said casing, said strip being marked longitudinally for time and laterally for speed of travel, arms on said bracket with friction rollers for advancing said strip longitudinally and depositing it into said casing, a door on said casing permitting removal of said rolled strip and the deposited portion of said strip, a member with marking means movable laterally over said strip for producing a continuous speed record line on said strip, and gear means arranged for connection with and to be driven by a movable member of the speedometer for actuating said member.

In testimony whereof I have signed my name to this specification in the presence of two subscribing witnesses.

JOSEPH A. SINGER.

Witnesses:
JOSHUA R. H. POTTS,
FREDA C. APPLETON.